May 20, 1952    L. N. POND ET AL    2,597,373
GLASS-SEVERING APPARATUS
Filed March 16, 1949    4 Sheets-Sheet 1

INVENTORS
LEANDER N. POND AND
NORMAN MAX WISNER
BY Rolf E. Schneider
ATTORNEY

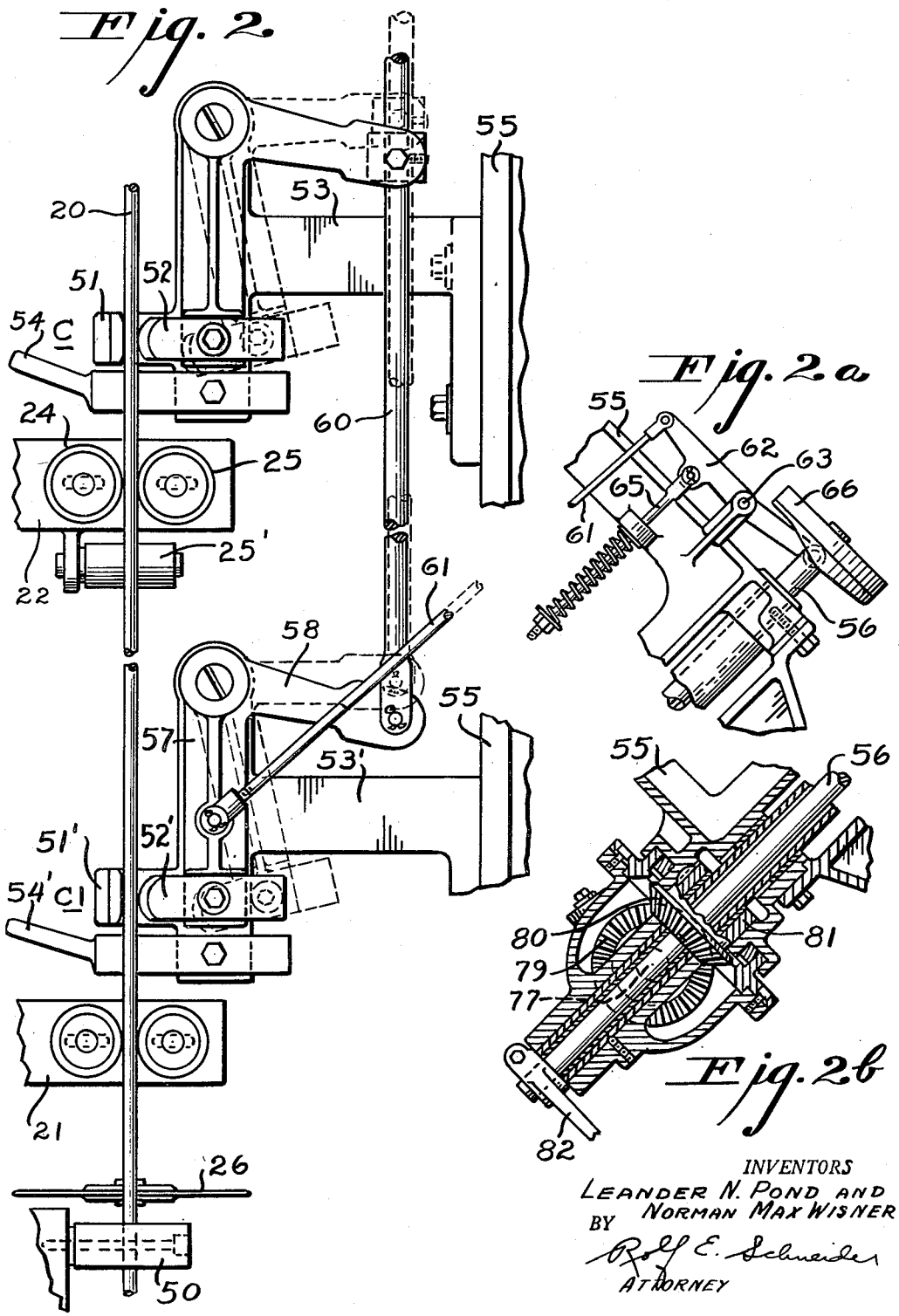

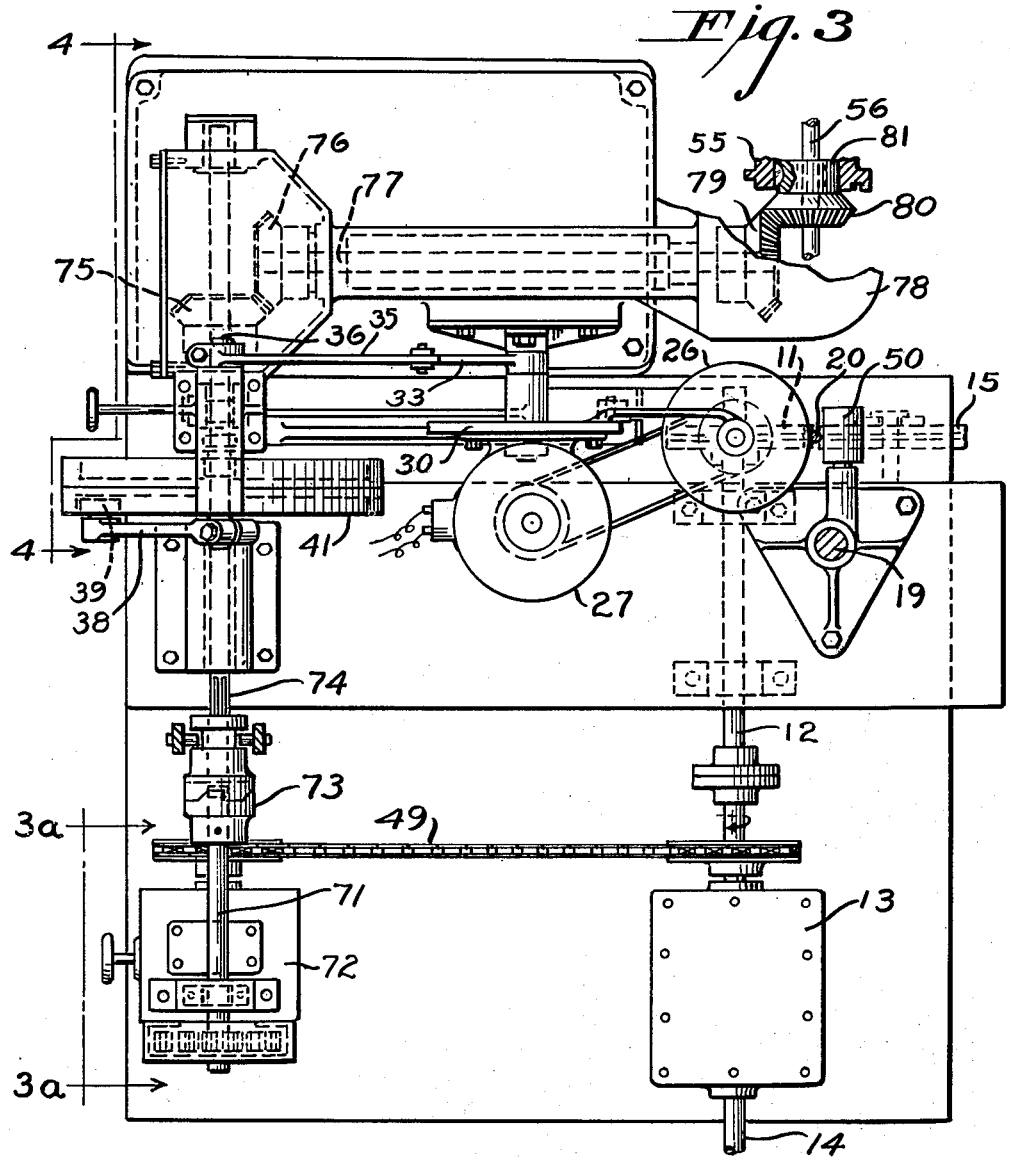
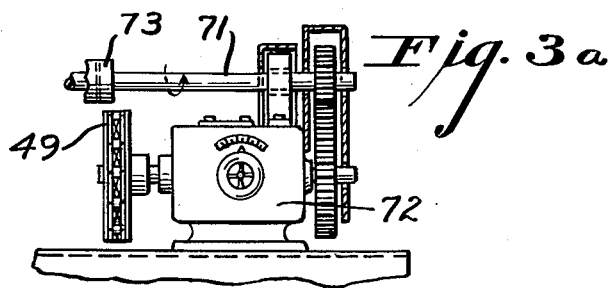

May 20, 1952 L. N. POND ET AL 2,597,373
GLASS-SEVERING APPARATUS
Filed March 16, 1949 4 Sheets-Sheet 4
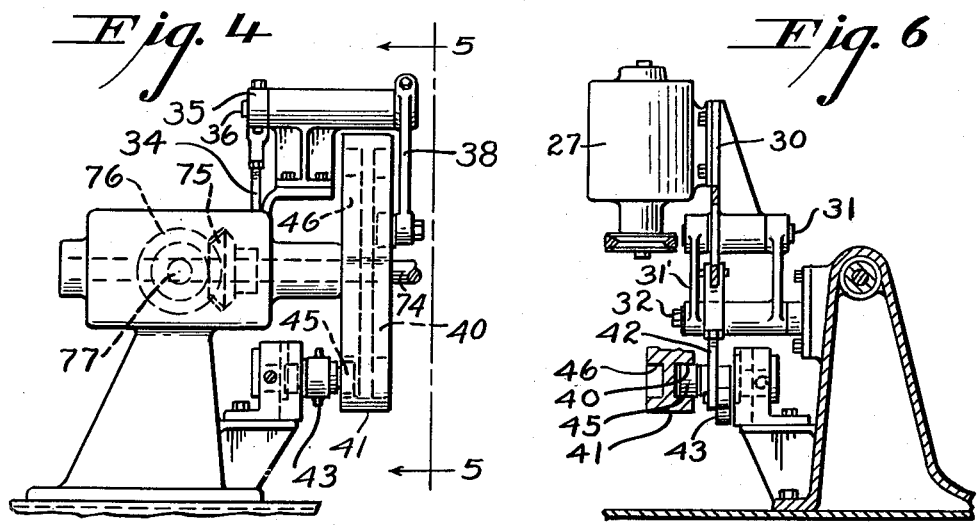
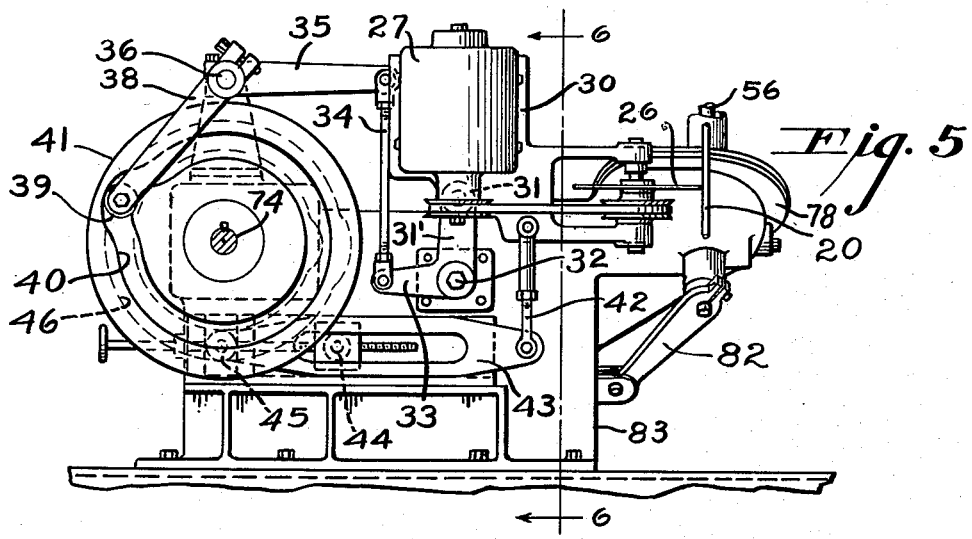
INVENTORS
LEANDER N. POND AND
NORMAN MAX WISNER
BY
ATTORNEY Patented May 20, 1952

2,597,373

UNITED STATES PATENT OFFICE 2,597,373

GLASS SEVERING APPARATUS

Leander N. Pond and Norman Max Wisner, Corning, N. Y., assignors to Corning Glass Works, Corning, N. Y., a corporation of New York Application March 16, 1949, Serial No. 81,672

8 Claims. (Cl. 49—48)

The present invention relates to glass severing apparatus and is particularly concerned with the provision of an arrangement suitable for use with tube or cane drawing apparatus associated with a molten glass supply body from which a linear body of tubing or cane is drawn continuously.

In using drawing apparatus of the foregoing general character wherein the glass is drawn in a vertical plane, it has been the general practice for an attendant to manually sever the tubing or cane, as it issues from the apparatus, into desired lengths convenient for handling.

The prime object of the present invention is an arrangement suitable for automatically severing and separating predetermined lengths of tubing or cane as it issues from an apparatus by means of which the glass is drawn in a vertical plane.

Fig. 1 of the accompanying drawings is a perspective view of an apparatus embodying the invention, shown associated with a conventional form of updraw machine.

Fig. 2 is an enlarged fragmentary view of part of the apparatus of Fig. 1 primarily illustrating chucks and parts of a conveyor adapted to seize and convey severed lengths of glass out of the vertical path of the oncoming glass.

Fig. 2a is a fragmentary view primarily illustrating a further part of the conveyor and an associated cam under whose control the chucks are opened and closed.

Fig. 2b is a fragmentary sectional view showing the opposite end of the portion of the conveyor shown in Fig. 2a.

Fig. 3 is a sectional plan view of the apparatus of Fig. 1 of particular value in depicting the drive arrangement of applicant's apparatus and its manner of drive from the tube-drawing machine.

Fig. 3a is a view taken on line 3a—3a of Fig. 3 with certain parts broken away.

Fig. 4 is a fragmentary view of the apparatus taken on line 4—4 of Fig. 3.

Fig. 5 is a fragmentary view taken on line 5—5 of Fig. 4.

Fig. 6 is a fragmentary view taken on line 6—6 of Fig. 5.

Figure 1:
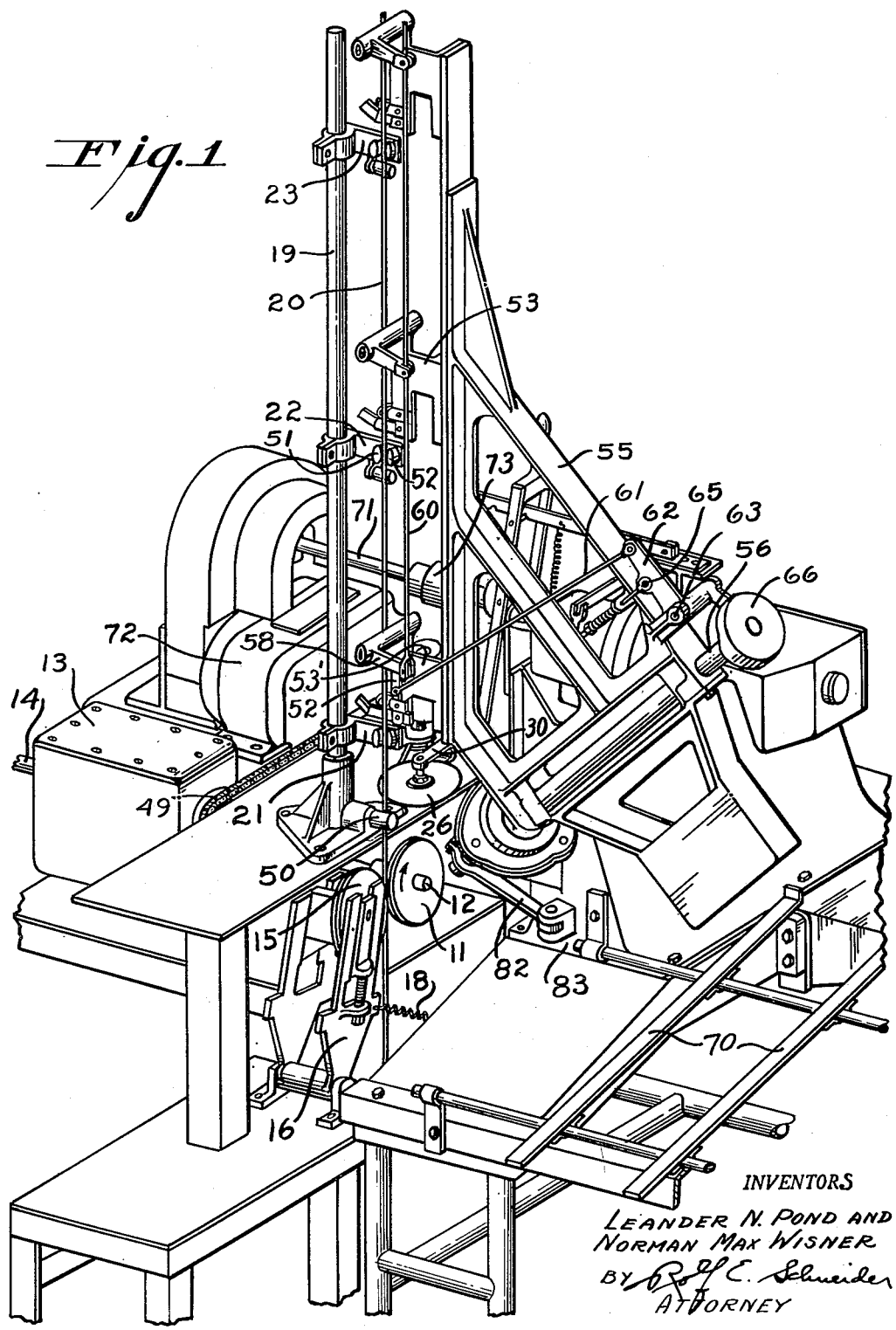

In brief, the conventional drawing apparatus illustrated comprises a drawing wheel 11 (Figs. 1 and 3) carried by a shaft 12 extending from a transmission case 13 and driven by a motor (not shown) connected in driving relation to a shaft 14 entering the opposite end of case 13. A wheel 15, supported on an arm 16 (Fig. 1), is adapted to hold the tubing or cane 20 (hereinafter referred to as tubing) being drawn upward from a supply source (not shown) in engagement with the driving wheel 11 under tension of a spring 18.

Applicant's associated severing apparatus includes a vertical standard 19 (Figs. 1 and 3) having laterally projecting arms 21, 22, and 23, each carrying rollers such as rollers 24, 25, and 25' (Fig. 2) which lightly engage the drawn glass tubing 20 to give it support against whipping movements, particularly when very small-diameter tubing is being drawn.

Each time the tubing being drawn attains the desired height, for example the height of standard 19, an abrading disc 26 (Figs. 1, 2, 3, and 5) driven by a motor 27 (Figs. 3, 5, and 6) engages the tubing to abrade it and moves upward along a path parallel to its axis until the tubing is suitably abraded. The abrading disc 26 thereafter moves away from the tubing and down to its starting position.

To move the disc 26 through the above-described path, it and motor 27 are carried by a support 30 (Figs. 3, 5, and 6) pivotally mounted at 31 upon an arm 31' of a bell crank pivoted at 32 and having its other arm 33 attached to a link 34 extending to the free end of an operating arm 35 fixed to a shaft 36. An arm 38 having one end also fixed to shaft 36 at its other end carries a roller 39 adapted to travel in a groove 40 of a drum cam 41. The contour of groove 40 is such as to swing support 30 and with it the disc 26 a desired distance toward and away from the path of travel of the tubing once during each revolution of drum 41.

The support 30, in addition to being pivotally carried on bell crank arm 31', is also connected by a link 42 to one end of a lever 43 pivoted at 44, and at the other end carrying a roller 45 adapted to ride in a cam groove 46 in drum 41. The contour of groove 46 determines the extent support 30 will turn about pivot 31 during each revolution of the drum 41.

The contours and relation of grooves 40 and 46 are such that during each revolution of drum 41 the axis of disc 26 is maintained parallel to the direction of draw, is brought into engagement with the glass, moves upward in unison therewith while performing an abrading operation, and is then drawn away therefrom and returned to its lowermost position until such time that its upward movement again begins. The drum 41 is fixed to a shaft 74 driven by the tube-drawing drive through a chain 49 (Fig. 3), as will be fully described hereinafter. An arm 50 (Figs. 1, 2, and 3) at the base of the vertical standard 19 provides a rigid backstop for the tubing during the abrading operation.

Immediately after abrasion of the tubing the length to be severed is seized by a plurality of chucks, such as chucks C and C1 (Fig. 2). These chucks have fixed jaws 51 and 51' respectively, and movable jaws 52 and 52' respectively, carried on extensions 53 and 53' of a conveyor 55. The conveyor 55 is freely rotatable about a column 56 (Fig. 1, 2a, 2b, and 3) whose axis is approximately 45° from the horizontal, so that during each revolution of conveyor 55, chucks C and C1 pass through the vertical path of travel of the glass and through a horizontal path convenient for the delivery of seized tubing to a suitable support.

Each movable chuck jaw, such as jaw 52' of chuck C1 (Fig. 2), is attached to one arm of a bell crank. For example, chuck jaw 52' is attached to bell crank arm 57 of a bell crank pivoted on conveyor extension 53'. The other arm 58 and the corresponding arms of the bell cranks of the remaining chucks are connected to one another by an actuating link 60 so that the movable jaws are operable in unison. Actuation of chucks C and C1 is effected by means of a rod 61 coupled between bell crank arm 57 and one end of an actuating lever 62 pivoted intermediate its ends at 63 on conveyor 55. A spring-actuated pull rod 65 tends to hold the lever 62 in position to hold the chucks C and C1 closed.

Opening and closing of the chucks is under control of a crown cam 66 fixed to the free end of column 56 and cooperative with the free end of lever 62 as the conveyor 55 rotates about the column. The cam 66 is of such contour as to permit sudden closure of the chucks the instant that they are brought into seizing relation with a tube. As movement of the chucks transversely of the path of travel of the tube continues, the seized tube breaks where abraded. Fixed arm 50 at the base of standard 19 assists the wheels 11 and 15 in holding the oncoming tubing vertical during the breaking operation. The contour of cam 66 is also such that it quickly opens the chucks at such time that they approach a position in which the held tube is in a horizontal position. In this position the tube is over a group of tube-receiving bars, such as bars 70 (Fig. 1), and is free to roll by gravity from the open chucks onto a pair of conveyor extensions 54 and 54' from which it drops onto the receiving bars.

The conveyor 55 receives its drive from a shaft 71 (Figs. 3 and 3a) of a variable speed transmission assembly 72 driven by chain 49. Shaft 71 is connected through a clutch 73 to shaft 74, which, in addition to carrying drum 41, carries a bevel gear 75. Gear 75 is in mesh with a similar gear 76 mounted on one end of a shaft 77. The other end of shaft 77 terminates in a gear box 78 and is provided with a bevel gear 79 in mesh with a bevel gear 80 having a hub 81 keyed to the conveyor 55. Turning movement of column 56, about which conveyor 55 rotates, is prevented by a holding bar 82 (Figs. 1 and 5) having one end clamped about the lower end of the column and having its other end suitably attached to framework 83 of the apparatus.

We claim:

1. In an apparatus for severing a linear body of glass into sections of predetermined length as such body passes toward a delivery position, an abrader arranged along the path of travel of the body, means for operating said abrader at predetermined intervals to abrade the body along the desired lines of severance, a chuck, means for conveying said chuck about an endless path passively bringing it across that portion of the path of movement of the body between the abrader and delivery position immediately after an abrading operation, and means for closing said chuck about the body so that as the travel of the chuck continues, that portion of the body between the abrader and delivery position is fractured where abraded and carried away by said conveying means.

2. An apparatus such as defined by claim 1, wherein means is provided adjacent the abrader for taking the lateral thrust applied to the body while completion of fracture is taking place.

3. In an apparatus for conveying a length of glass from a vertical plane of formation to a horizontal plane, a chuck, a rotatable conveyor for said chuck adapted to move the chuck about an endless path crossing the path of travel of the glass in a horizontal direction, means for continuously rotating said conveyor, means for actuating said chuck to seize the glass each time the path of travel of the latter is crossed, and means for automatically abrading the glass substantially at the time of seizure so that during the subsequent movement of said chuck about its path, fracture of the glass is effected in the abraded area, said second means being operable to thereafter restore said chuck to release the seized glass therefrom.

4. In an apparatus such as defined by claim 3, wherein the means for actuating the chuck includes an element carried by the conveyor and cooperative with a cam fixed with respect to said conveyor.

5. For use with a machine for the continuous draw of a linear body of material to a position for severance, an abrader, means for operating said abrader at predetermined intervals to abrade the body being drawn preparatory to complete severance of a section thereof therefrom, a chuck, means for conveying said chuck along an endless path passing transversely through the path of movement of the body into engaging relation with the section thereof to be separated therefrom, and means for closing said chuck about the section of the body engaged, so that as the travel of the chuck continues, the seized section is fractured where abraded and carried away by said chuck, said last means including means for opening said chuck to free the section therefrom after it is carried away from the parent body and before the chuck again passes through the path of movement of the body.

6. In an apparatus for intermittently abrading a linear glass body as such body passes a predetermined zone in its path of travel toward a delivery position, a support, an abrading disc and driving means therefor mounted on said support, and means for so moving said support that said disc is brought into a position to engage the body and move therewith for a limited distance, and for then so moving said support that said disc is moved out of the latter position and restored to its initial position, said means including two separately controlled linkages, one turning said support through an arc primarily transverse to the path of travel of the body, and the other turning said support about an arc primarily longitudinal to the path of travel of the body.

7. In a mechanism for severing lengths of glass from a linear supply body thereof as such body moves from a source of formation toward a delivery position, an abrader arranged along the path of travel of the supply body, means for automatically engaging said abrader with the body during a limited distance of its travel each time a desired length thereof has passed said abrader, means for seizing the length which has passed the abrader at substantially the same time that said abrader becomes disassociated therefrom, a rotatable conveyor supporting said last means and adapted to continuously rotate to move such means along a circular path of travel passing transversely through the path of travel of the supply body whereby the seized section is fractured and moved out of the path of the supply body, and means for continuously rotating said conveyor.

8. An apparatus for severing a linear body of glass into sections of predetermined length as such body passes toward a delivery position, comprising an abrader arranged along the path of travel of the body, operating means for said abrader capable of operating the same at predetermined intervals to abrade the body along the desired lines of severance, means for seizing the abraded lengths of the body, a conveyor adapted to move such means along an endless path of travel passing transversely through the path of travel of the body between the abrader and the delivery position, means for actuating said seizing means as an abraded length of the body is encountered thereby, whereby the seized section of the body is fractured from and moved out of the path of travel of the body, and means for continuously rotating said conveyor.

LEANDER N. POND.
NORMAN MAX WISNER.

REFERENCES CITED

The following references are of record in the file of this patent:

UNITED STATES PATENTS

| Number | Name | Date |
|---|---|---|
| 1,539,258 | Graupner | May 26, 1925 |
| 1,573,232 | Ekstrom | Feb. 16, 1926 |
| 1,996,387 | Owen | Apr. 2, 1935 |
| 2,195,625 | Knaggs | Apr. 2, 1940 |
| 2,415,997 | Eldred | Feb. 18, 1947 |